(12) United States Patent
Shibata (10) Patent No.: US 8,703,246 B2
(45) Date of Patent: *Apr. 22, 2014

(54) COATING DEVICE AND COATING METHOD (75) Inventor: Ichiro Shibata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/047,079

(22) Filed: Mar. 14, 2011

(65) Prior Publication Data

US 2011/0165317 A1 Jul. 7, 2011

Related U.S. Application Data

(63) Continuation of application No. 11/579,674, filed as application No. PCT/JP2005/007914 on Apr. 26, 2005, now Pat. No. 7,927,665.

(30) Foreign Application Priority Data

May 7, 2004 (JP) .................................. 2004-138839

(51) Int. Cl.
*B05D 1/02* (2006.01)

(52) U.S. Cl.
USPC ............. 427/424; 118/57; 118/324; 118/325; 118/663; 267/136; 427/346; 427/356

(58) Field of Classification Search
USPC ........... 118/57, 324, 325, 663, 665, 679, 688; 267/136; 427/346, 356, 421.1, 424
See application file for complete search history.

(56) References Cited

U.S. PATENT DOCUMENTS

| 5,060,519 A | 10/1991 | Chojitani et al. |
| 5,179,516 A | 1/1993 | Choshitani et al. |
| 5,180,958 A | 1/1993 | Choshitani et al. |
| 5,993,548 A | 11/1999 | Madrzak et al. |
| 2001/0040324 A1 | 11/2001 | Mayama et al. |

FOREIGN PATENT DOCUMENTS

| JP | 1210634 A | 8/1989 |
| JP | 5060519 A | 10/1991 |

(Continued)

OTHER PUBLICATIONS

Chinese Office Action dated Nov. 21, 2008, with English translation.

(Continued)

*Primary Examiner* — Alexander Weddle
(74) *Attorney, Agent, or Firm* — Sughrue Mion, PLLC (57) ABSTRACT

A coating method forming a coating film having a predetermined film thickness on a band-like support body. The method includes conveying the band-like support body; forming the coating liquid on the band-like support body using a coating device fixed on an vibration isolation device; and detecting vibration components on a surface of a floor on which the coating device is disposed and controlling vibration of the active vibration isolation device.

2 Claims, 5 Drawing Sheets

(56) References Cited

FOREIGN PATENT DOCUMENTS

| | | | |
|---|---|---|---|
| JP | 9192564 A | | 7/1997 |
| JP | 9206651 A | | 8/1997 |
| JP | 09206651 A | * | 8/1997 |
| JP | 9206660 A | | 8/1997 |
| JP | 1157586 A | | 3/1999 |
| JP | 2000-21702 A | | 1/2000 |
| JP | 2002239432 A | | 8/2002 |
| JP | 2003-1170 A | | 1/2003 |
| JP | 2003001170 A | * | 1/2003 |
| JP | 2003-232398 A | | 8/2003 |
| JP | 2003222186 A | | 8/2003 |
| JP | 2003236449 A | * | 8/2003 |

OTHER PUBLICATIONS

Japanese Patent Office, corresponding to Patent Application No. 2004-138839, dated May 12, 2010.

International Search Report, issued Jun. 7, 2005, issued by Japanese Patent Office.

Japanese Office Action, corresponding to Patent Application No. 2004-138839, dated May 12, 2010.

* cited by examiner

COATING DEVICE AND COATING METHOD

This is a continuation of application Ser. No. 11/579,674, filed on Nov. 7, 2006, (now U.S. Pat. No. 7,927,665, issued Apr. 19, 2011), which is a National Stage Application of PCT/JP2005/007914, filed on Apr. 26, 2005, which claims priority from Japanese Patent Application S.N.: 2004-138839, filed May 7, 2004, which is incorporated herein by reference.

TECHNICAL FIELD

The present invention relates to a coating device and coating method, and particularly, to a coating device and coating method suitable for forming a long and wide coating film surface by applying a variety of liquid compositions of matter to a continuously conveyed web (band-like flexible support body).

BACKGROUND OF THE INVENTION

Conventionally, in the field of photo-sensitive materials or magnetic recording media etc., a coating process for forming a coating film in that a predetermined coating liquid is applied onto a continuously conveyed band-like flexible support body (hereinafter, referred to as "web") has been employed. Recently, in these fields, a coating technology is required which can provide a coating film having a film thickness of high accuracy and a surface that is flat and has no coating irregularity.

Similarly, also in a coating process applied to production of an optical film having various functionalities such as an optical compensation film, antireflection film or antidazzle film, the coating technology above is necessary.

Conventionally, it has been circumstances that a coating device for applying a coating liquid onto the surface of a web includes, for example a type of a roll coater, gravure coat, roll coat with a doctor, reverse roll coater, extrusion, or slide coat, and different coating device is used depending on its application.

In any of these coating devices, in order to achieve a coating film having a film thickness of high accuracy and a flat surface without coating irregularity, it is important to eliminate vibration at coating. For this purpose, a big separate foundation is usually provided on a base level (normally, the first floor in a building) and the coating device, generally, is established on the foundation. According to this, vibration of the foundation itself is suppressed to protect a coating film from being badly affected.

However, in such method, it is requested in principle to establish a coating device on a base level, and so there are disadvantages that the establishment is very expensive and constraints are posed on design and layout.

In order to resolve these problems, it is proposed that a reverse roll coating device is provided with a vibration suppression portion to damp vibration acting on a web (see, Patent Document 1). Also, it is proposed that at least one drive system is mounted on a vibration isolation system when coating a cylindrical base material (see, Patent Document 2).
Patent Document 1: Japanese Patent Application Laid-Open No. 2002-239432
Patent Document 2: Japanese Patent Application Laid-Open No. 9-206660

SUMMARY OF THE INVENTION

Problems to be Solved by the Invention

However, even if the various well-known means above are employed, in order to achieve a coating film having a film thickness of high accuracy and a flat surface without coating irregularity, improvement is required, because it is not easy to determine an optimal range of aspects of facilities, condition settings and the like.

Also, conventionally, in order to achieve a coating film having a film thickness of high accuracy and a flat surface without coating irregularity, because it is unknown which parameter of the coating device is to be controlled into an optimal range, only a management mainly based on past experiences or intuition has been performed, and then, a clue as to optimization could not be provided.

Further, a coating liquid includes many a time a flammable solvent and therefore there remain safety concerns unresolved.

The present invention is attained in consideration of such foregoing circumstances, and it is an object of the present invention, in the technical field of forming a coating film having a predetermined film thickness on a continuously conveyed band-like flexible support body at a location apart by a predetermined distance from coating liquid supply means while a coating liquid being supplied by the coating liquid supply means, to provide a coating device and coating method for forming a coating film having a film thickness of high accuracy and a flat surface without coating irregularity, in which its establishment does not require large expense and a fewer constraints are posed on design and layout.

Means for Solving the Problems

In order to solve the problems described above, the present inventions provides a coating device, comprising: coating liquid supply means for supplying a coating liquid; and coating means for forming a coating film having a predetermined film thickness on a continuously conveyed band-like support body at a location apart by a predetermined distance from the coating liquid supply means while the coating liquid is supplied by the coating liquid supply means, wherein the coating means is fixed on an active vibration isolation device.

According to the present invention, because the coating means is fixed on the active vibration isolation device, a variety of vibrations are suppressed to prevent a coating film being affected. As a result, it is easy to achieve a coating film having a film thickness of high accuracy and a flat surface without coating irregularity. Further, establishment of the coating device does not require large expense and a fewer constraints are posed on design and layout. That is, it is not necessarily required for the coating device to be mounted on a base level, and it is possible to install it, for example, on the fourth floor.

Now, the active vibration isolation device is a device which actively removes vibration using a pneumatic actuator etc. in a feedback control configuration and so, is different from a normal vibration isolation device (so-called passive vibration isolation device) which uses laminated rubber, an air spring or the like. In case of a commercial device, for example, the device with the product name "Active Micro-vibration Control Device" available from TOKKYOKIKI CORPORATION may be used.

Further, typically, the band-like support body, which is a body to be coated, is often a band-like flexible support body (web), but, the present invention may be applied to a band-and-plate-like body such as a glass substrate or a silicon wafer, and a similar effect may be obtained.

In the present invention, preferably, the active vibration isolation device may be a device for actively removing vibration by feedback control of vibration components detected by a sensor to actuate the pneumatic actuator. In an active vibration isolation device in such configuration, various vibrations may be suppressed to prevent a coating film from suffering a bad effect.

Further, preferably, the active vibration isolation device may have an explosion-proof structure. When such vibration isolation device is an explosion-proof type, it may excel in a safety aspect.

Also, in the present invention, vibration acceleration acting on the coating means may be preferably not greater than 0.2 Gal. A variety of experiments carried out by the applicant confirmed that in the coating means receiving such vibration acceleration, a coating film having a film thickness of high accuracy and a flat surface without coating irregularity can be obtained. The details will be described below.

Moreover, in the present invention, a first order natural frequency of the coating means may be preferably not less than 80 Hz. A variety of experiments carried out by the applicant confirmed that in the coating means having such first order natural frequency, a coating film having a film thickness of high accuracy and a flat surface without coating irregularity can be obtained. The details also will be described below.

Also, the present invention provides a coating method using the coating device above and characterized in that a first order natural frequency of the surface of a floor on which the coating device is installed is set to not less than 10 Hz. A variety of experiments carried out by the applicant confirmed that by installing the coating device on such floor having such first order natural frequency, a coating film having a film thickness of high accuracy and a flat surface without coating irregularity can be obtained. The details also will be described below.

Effects of the Invention

As described above, according to the present invention, because coating means is fixed on an active vibration isolation device, a variety of vibrations can be suppressed to prevent a coating film from suffering a bad effect. As a result, it is easy to achieve a coating film having a film thickness of high accuracy and a flat surface without coating irregularity.

DETAILED DESCRIPTION OF THE INVENTION

Best Mode for Carrying Out the Invention

Figure 1:
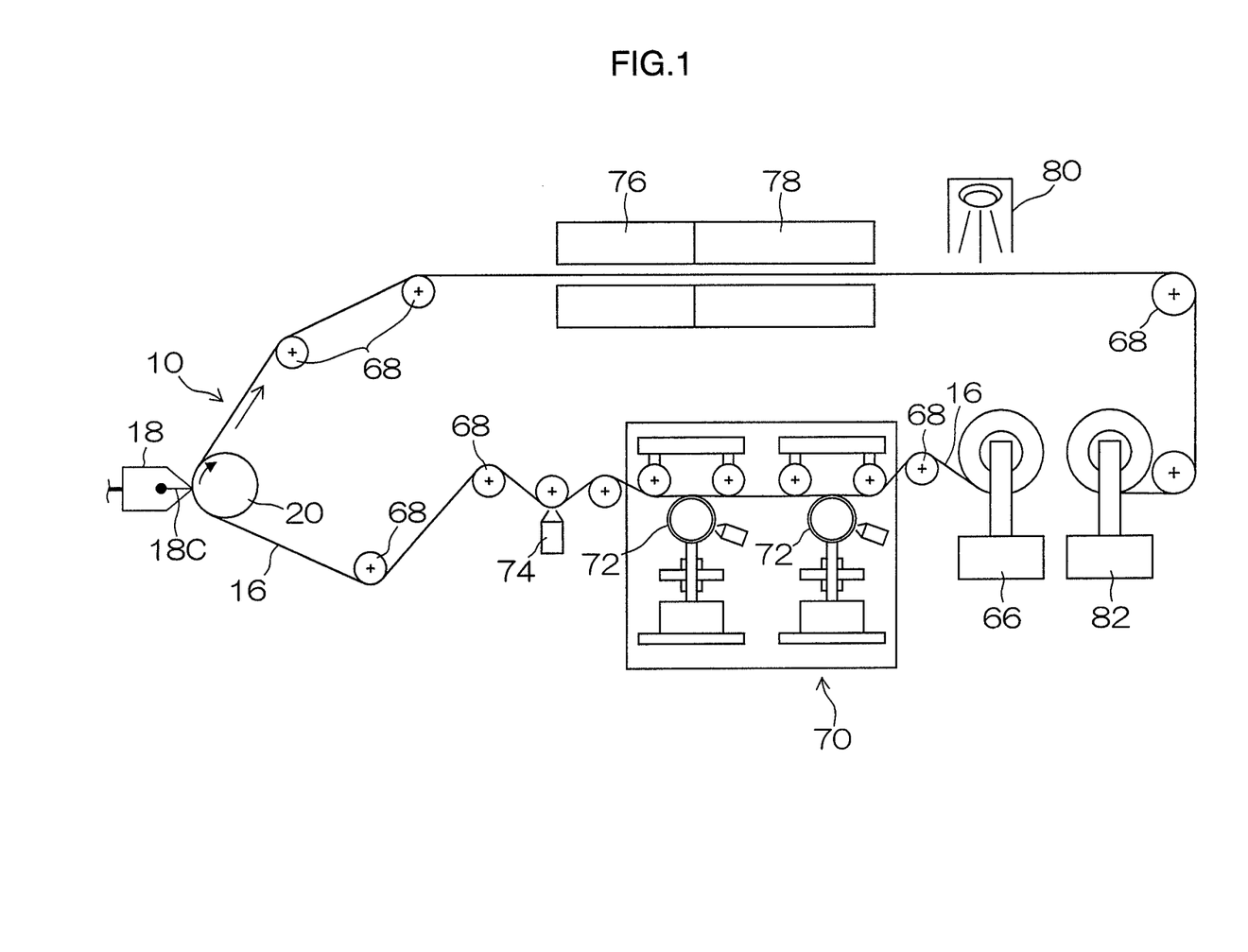
FIG. 1 illustrates a production line of an optical compensation sheet in which a coating method and coating device according to the present invention are employed.
Figure 2:
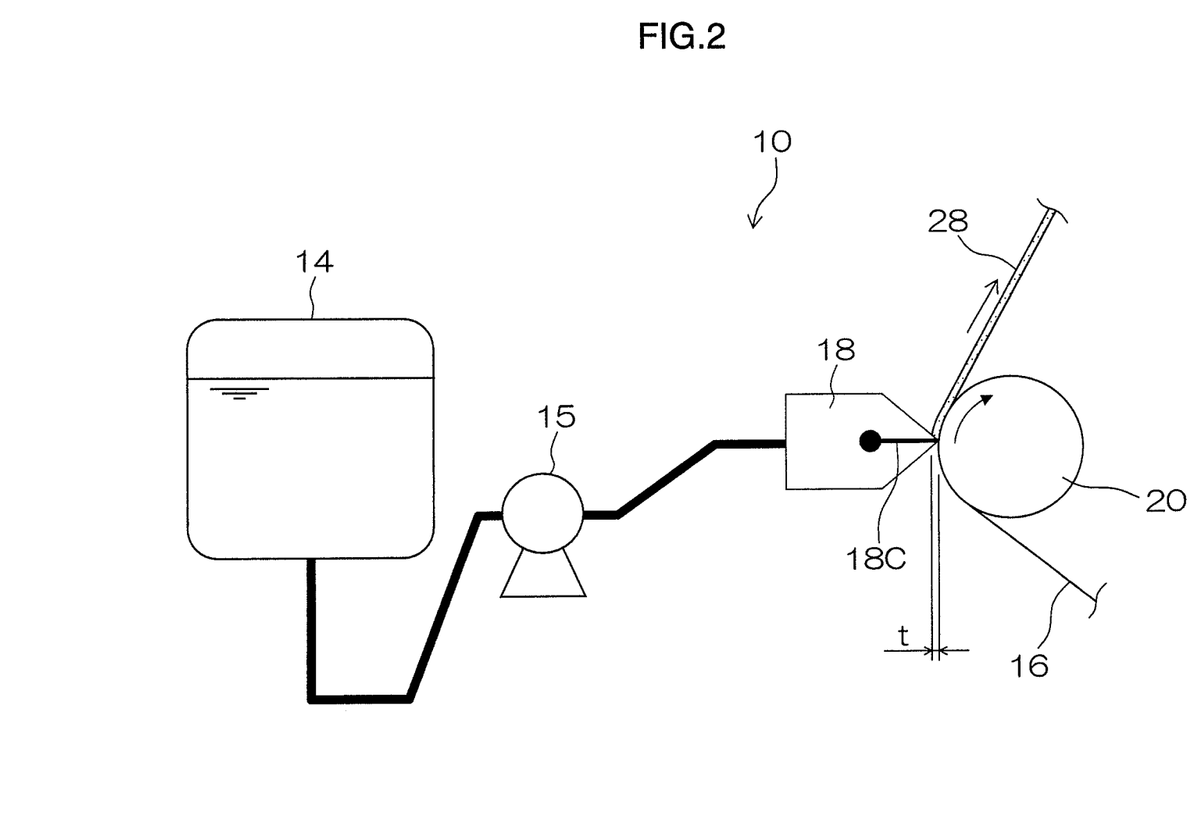
FIG. 2 is a conceptual diagram with substantial parts being enlarged illustrating an aspect of the coating device.
Figure 3:
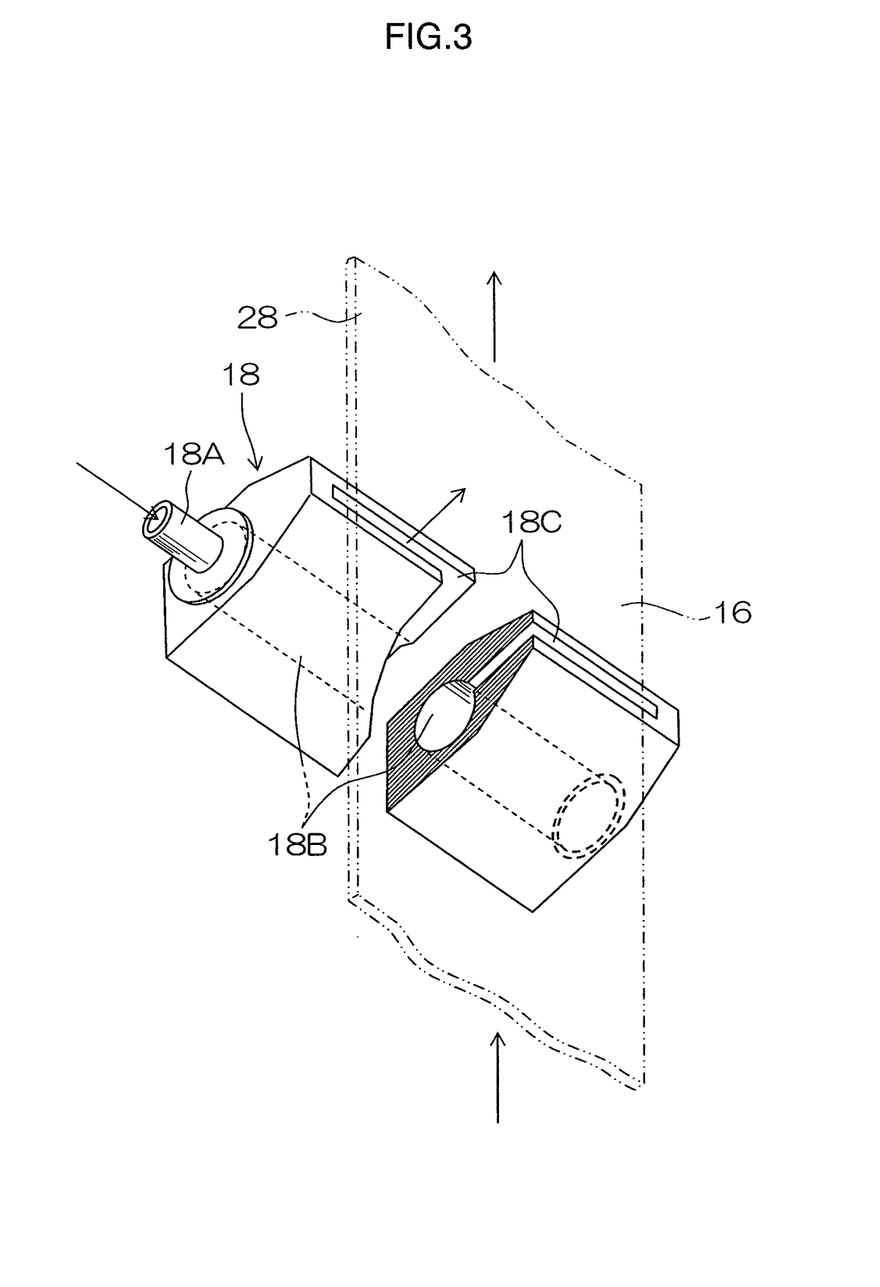
FIG. 3 is a perspective view of a coating head partially cut off.
Figure 4:
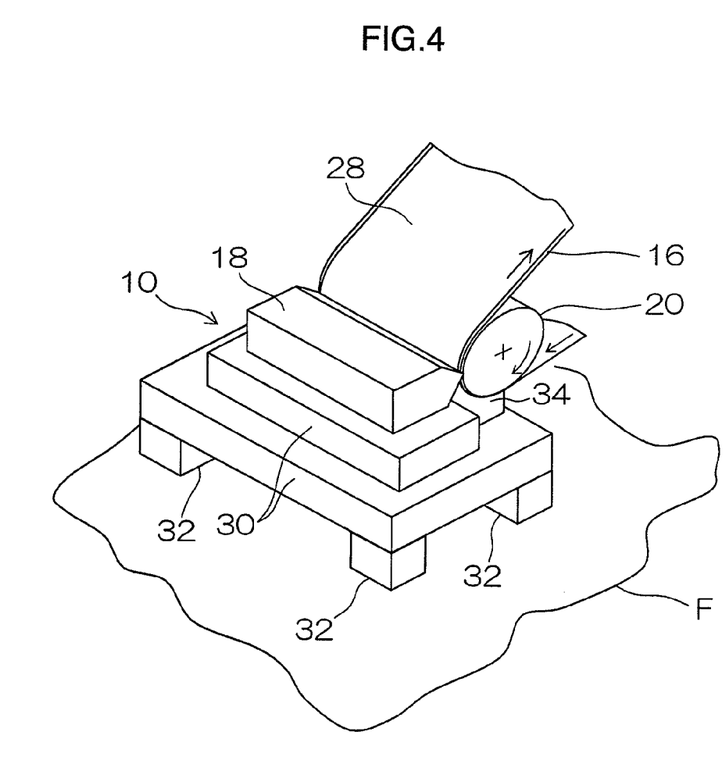
FIG. 4 is a perspective view illustrating situations in which the coating device is established.

Now, a preferable embodiment of a coating device and coating method according to the present invention will be described in detail with reference to accompanying drawings. FIG. 1 illustrates a production line of an optical compensation sheet in which the coating device and coating method according to the present invention are employed. FIG. 2 is a conceptual diagram with substantial parts in this production line being enlarged for illustrating an aspect of the coating device 10. FIG. 3 is a perspective view of a coating head 18 partially cut off in the coating device 10. FIG. 4 is a perspective view illustrating situations in which the coating device 10 is established.

In the production line of an optical compensation sheet, as shown in FIG. 1, a web 16, i.e. a transparent support body on which a polymer layer for forming an oriented film is formed in advance is sent forth from a feeder 66. The web 16 is guided by a guide roller 68 to proceed into a rubbing process device 70. A rubbing roller 72 is provided to apply a rubbing process to the polymer layer. A dust removal device 74 is provided downstream from the rubbing process device 70 to remove dust adhering to the surface of the web 16.

Downstream from the dust removal device 74, the coating device 10 is provided to coat the web 16 with a coating liquid including disconematic liquid crystal. Also, downstream from this, a drying zone 76 and heating zone 78 are provided in sequence to form a layer of liquid crystal on the web 16. Further, downstream from this, an ultraviolet lamp 80 is provided to bridge liquid crystal by ultraviolet irradiation to form a desired polymer. Also, downstream from this, a winder 82 is provided to wind up the web 16 on which the polymer was formed.

The coating device 10, as shown in FIG. 2, includes a coating liquid tank 14, a pump 15 delivering the coating liquid from this coating tank 14, a coating head 18 for coating the web 16 with the coating liquid delivered by the pump 15, piping for joining these together up and a backup roller 20 disposed opposite to the coating head 18 for supporting the web 16 at coating.

A constant-flow pump may be preferably used as the pump 15 because of stability of a supply flow of the coating liquid. As a constant-flow pump, various pumps, for example, a gear pump, roller pump etc. may be used, and especially, the gear pump can be suitably used at coating according to the present invention.

An end of the coating head 18 is disposed opposite and close to the web 16 which continuously runs. In the coating head 18, as shown in FIG. 3, a tubular pocket portion 18B is formed parallel to the web 16 in the width direction thereof, and the pocket portion 18B for coating is joined to a supply line 18A. Further, in the coating head 18, a coating slit 18C having a discharge outlet in the end of the coating head is provided, and the coating slit 18C is communicated with the pocket portion 18B for coating.

The coating slit 18C provides a narrow flow channel joining the pocket portion 18B and the end of the coating head and extending in the width direction of the web 16. Then, a desired amount of the coating liquid to be applied onto the web 16 is supplied from the supply line 18A to the pocket portion 18B for coating.

Further, in FIG. 3, a method of delivering the coating liquid to the pocket portion 18B for coating by supplying it from the one side of the pocket portion 18B for coating is illustrated. However, in addition to this method, there may be a method in that the coating liquid is supplied from the one side of the pocket portion 18B for coating and drawn out from the other side, or in that the coating liquid is supplied from the central portion of the pocket portion 18B for coating and split into both side, and either method may be applicable.

As shown in FIG. 2, in the coating device 10, the end of the coating head 18 is arranged opposite to the backup roller 20 clockwise rotating at a position of nine o'clock of it. Further, a distance t between the end of the coating head 18 and the surface of the web 16 is established. As shown, the coating head 18 coats the web 16 with the coating liquid to form a coating film 28, and this web 16 is supported and conveyed clockwise by the backup roller 20.

However, the position of the end of the coating head 18 is not limited to the position of nine o'clock of the backup roller 20 rotating clockwise. If it is possible to apply an even coating, the position of the end of the coating head 18 may have no limitation.

Further, especially, a size of an external diameter of the backup roller 20 has no limitation as possible as an even coating can be applied. Also, a configuration in that a plurality of backup rollers having a smaller diameter are disposed circumferentially in place of the backup roller 20 as shown may be employed.

Moreover, the coating head 18 is not limited to the extrusion type, and any type of a coating head may be employed, if it is configured to supply a coating liquid from a slit to coat the web 16 with the coating liquid. Further, coating means not using the coating head 18, for example, various coating means such as coating means of a roll coater type, coating means of a reverse roll coater type or the like may be adopted.

Also, a tension controller to control tension of the web 16 and a drive controller to control the web 16 to travel, not shown, may be optionally provided.

Next, an active vibration isolation device built to explosion-proof specifications and providing features of the present invention will be explained in relation to its configuration with reference to FIG. 4. In this configuration, the coating head 18 is fixed on a coating head base 30, and under four corners of this coating head base 30, the active vibration isolation devices 32 are disposed and the coating head base 30 is supported on a floor F via these active vibration isolation devices 32.

Further, below the backup roller 20, a depressurization chamber 34 is disposed, and a reduced pressure in the depressurization chamber 34 may allow beads of the coating liquid formed between the web 16 and the coating head 18 to stabilize.

This coating head base 30 may become large in size depending on the width of the web 16 etc., for example it may be 2.4×1.5 m in planar size and totally weigh up to 6.5 ton. Therefore, because the active vibration isolation devices 32 are disposed for the coating head 18 fixed on such coating head base 30, various vibrations may be suppressed to prevent the coating film from being inversely affected.

Figure 5:
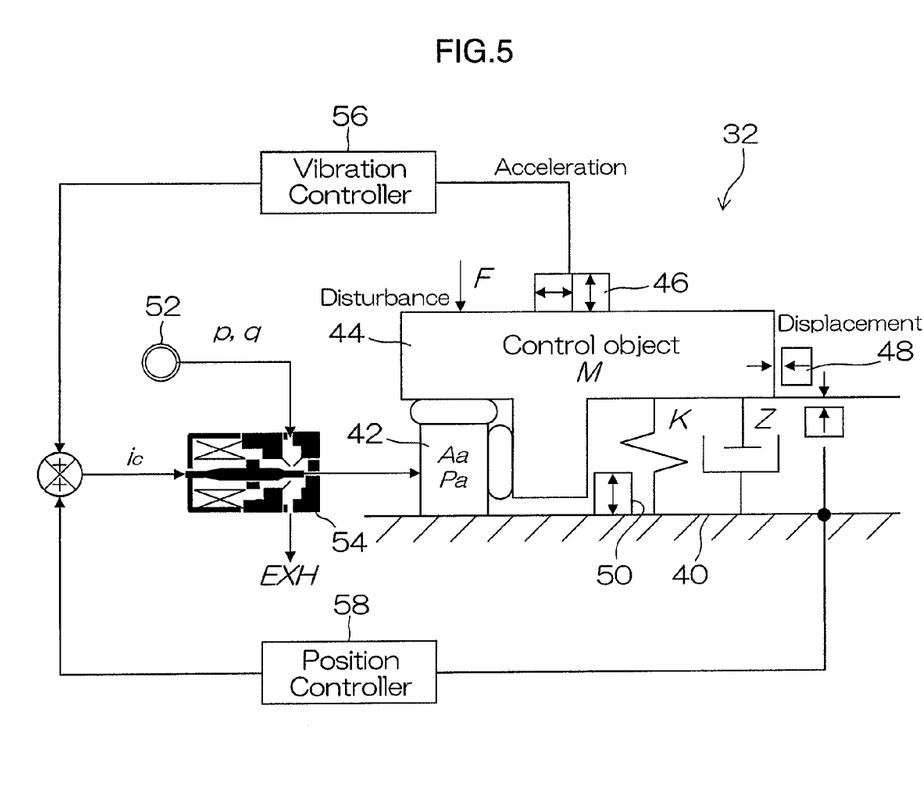
FIG. 5 is a conceptual diagram illustrating a system configuration of an active vibration isolation device.

FIG. 5 is a conceptual diagram illustrating a system configuration of the active vibration isolation device 32. A load bearing portion 44 is supported on a base 40 of the active vibration isolation device 32 via an air actuator 42. On this load bearing portion 44, an acceleration sensor 46 for detecting acceleration is fixed. Further, between the base 40 and the load bearing portion 44, a displacement sensor 48 for detecting displacement of the load bearing portion 44 is disposed, and moreover, on the base 40, an acceleration sensor 50 for detecting acceleration is also fixed.

The load bearing portion 44 is controlled by adjusting a flow of compressed air supplied from an air source 52 by a servo valve 54 to supply it to the actuator 42. This servo valve 54 receives a feedback signal from the acceleration sensor 46 through a vibration controller 56. Also, a feedback signal from the displacement sensor 48 is sent through a position controller 58. Further, the acceleration sensor 50 described above is used for feedforward control.

When a disturbance F is added to such system, a control object represented by factors of mass M, damping Z and spring K is controlled by the air actuator 42, and an active vibration isolation system is configured in which vibration from the floor is removed and a vibration suppression effect is developed for the disturbance F added to the load bearing portion 44.

As a result, according to the coating device 10 in FIG. 4, it is easy to achieve a coating film having a film thickness of high accuracy and a flat surface without coating irregularity. Further, establishment of the coating device 10 does not require large expense and a fewer constraints are posed on design and layout. That is, it is not necessarily required for the coating device 10 to be mounted on a base level (the first floor), and it is possible to establish it, for example, on the fourth floor. Moreover, because the active vibration isolation device 32 is according to explosion-proof specifications, it may excel in a safety aspect.

Next, a reason for why the first order natural frequency of the coating device 10 of not less than 80 Hz is preferable will be explained. In order to suppress vibration at coating and prevent a bad effect from proceeding to the coating film, it is preferable to suppress vibration acceleration in the coating device 10 as much as possible. In so doing, even if the first order natural frequency of the coating device 10 is less than 80 Hz, the vibration acceleration can be reduced.

However, if the first order natural frequency of the coating device 10 is set to not less than 80 Hz, it may be a frequency range of this first order natural frequency in that the coating device 10 will oscillate strongly when vibration is applied. Further, a pitch between layers with stepped unevenness etc. generated at coating corresponds to this frequency range. However, a coating film for an optical film (optical compensation film, antireflection film etc.) is resistant to generation of stepped unevenness within this frequency range and a bad effect.

From that point, it may be preferable that the first order natural frequency of the coating device 10 is not less than 100 Hz, and more preferable that the first order natural frequency of the coating device 10 is not less than 120 Hz.

Next, a reason for why the first order natural frequency of the surface of the floor supporting the coating device 10 of not less than 10 Hz is preferable will be explained. When the active vibration isolation device 32 described above is used, if the first order natural frequency of the surface of the floor is less than 10 Hz, a vibration removal effect may be scarcely obtained. For example, if vibration has a vibration frequency of 100 Hz, it can be damped to about 1/100, but, if a vibration frequency becomes less than 10 Hz, only a slight damping effect may be obtained.

Therefore, it may be preferable that the first order natural frequency of the surface of the floor on which the coating device 10 is installed is not less than 20 Hz, and more preferable that it is not less than 30 Hz.

Next, formation of a coating film by using the coating device 10 will be explained. As a coating liquid, for example, a coating liquid having viscosity of not greater than 10 mPa·s and including an organic solvent may be used. However, a coating liquid having viscosity of rather than this and not including an organic solvent may be used.

Generally, as the web 16, a flexible band-like body including a plastic film such as polyethylene terephthalate (PET), polyethylene-2, 6-naphthalate, cellulose diacetate, cellulose triacetate, cellulose acetate propionate, polyvinyl chloride, polyvinylidene chloride, polycarbonate, polyimide or polyamide, paper, polyethylene, polypropylene, paper coated or laminated with α-polyolefins such as ethylene butane copolymer etc. having the carbon number of 2 to 10 or a metal plate which have a predetermined width, a predetermined length and a thickness of about 2 to 200 μm, or a band-like body having a processed layer formed on the surface thereof using the relevant band-like body as a base material can be used.

In the production line of the optical compensation sheet in FIG. 1, while the feeder 66 unreels the web 16, coating is carried out with a flow from the pump 15 (see FIG. 2) being controlled so that an average flow of the coating liquid in the slit 18C of the coating head 18 in the coating device 10 is 100 to 500 mm/sec, or a conveyance speed of the web 16 being controlled so that a film thickness of the coating film 28 immediately after coating is 2 to 40 µm.

In drying etc. after coating, the drying zone 76, the heating zone 78, the ultraviolet lamp 80 and the like are set up so that a coating film 28 having a coating film thickness of high accuracy and a flat surface is achieved. The winder 82 will take up the web 16 after coating and drying.

A sequence of processes above is conducted preferably in environments with a good cleanliness factor, and an optimal temperature and humidity. Therefore, the processes are preferably conducted in a clean room, and especially, the coating device 10 is preferably disposed in environments having a class of not greater than 100. To this end, a configuration in that a down flow clean room or clean bench is used together can be adopted.

Although the embodiment of the coating device and coating method according to the present invention has been explained, the present invention is not limited to the embodiment above and various aspects can be adopted.

For example, although in this embodiment, a coater of an extrusion type is used as the coating device 10, a coater of another type, for example a bar coater (also called "rod coater" and includes a Mayer bar coater), a gravure coater (such as a direct gravure coater, gravure kiss coater), a roll coater (transfer roll coater, reverse roll coater etc.), a die coater, a fountain coater and a slide hopper etc. may be suitably used.

Further, for applications of the coating device 10, it may be applicable to not only an optical film such as an optical compensation film etc. but also to various coating.

EXAMPLES

Hereinafter, an example of a coating device and coating method according to the present invention will be explained. We formed a coating film on the web 16 by using the coating device 10 in the production line of an optical compensation sheet shown in FIG. 1, and evaluated conditions of the surface of the coating film.

The coating device 10 was disposed on a coating station provided on the second floor portion in a building having a SRC beam structure. The first order natural frequency of the surface of the second floor of the building on which the coating station was provided was 15 Hz. On this surface of the floor, as shown in FIG. 4, the coating device 10 including the active vibration isolation devices 32 of an explosion-proof type under the four corners thereof was disposed. The first order natural frequency of the entirety of the coating device 10 was 120 Hz.

The coating slit 18C of the coating device 10 shown in FIG. 3 has a width of an aperture of 150 µm (a length in the direction of travel of the web 16) and a length of the aperture of 50 mm. A length of a lip land upstream from the coating head 18 is 1 mm and a length of a lip land downstream is 50 µm.

A distance t shown in FIG. 2 between the end of the coating head 18 and the surface of the web 16 was set to 50 µm, and a negative pressure in the depressurization chamber 34 in FIG. 4 was set to 1600 Pa.

During coating by the coating device 10, we made a heavy truck having a heavy load on board pass by the building, and measured vibration acceleration in the coating device 10.

We formed a resin layer for an orientation film by using a cellulose acetate film having thickness of 100 µm as a web 16 (product name: FUJITAC, available from Fuji Photo Film Co., Ltd.), applying a 2 weight % solution of a long-chain alkyl modified polyvinyl alcohol (product name: POVAL MP-203, available from KURARAY CO., LTD.) by 25 ml/m2 before coating with the coating liquid and drying for 1 minute at the temperature of 60° C.

Coating was carried out by unreeling the web 16 having the resin layer for the orientation film formed in advance thereon from the feeder 66, forming the orientation film by applying a rubbing process to the surface of the resin layer for the orientation film by the rubbing process device 70 and conveying the web 16 to the coating device 10. Further, a rotational speed of the rubbing roller 72 in the rubbing process was set to 5.0 m/sec, and pressing force on the web 16 was set to $9.8 \times 10^{-3}$ Pa.

As the coating liquid, a methyl ethyl ketone solution produced through the addition by 40 weight % of a mixture produced by adding 1 part by weight of a photo polymerization initiator (product name: IRGACURE 907, available from Nihon Ciba-Geigy KK.) to a mixture of discotic compounds TE-(1) and TE-(2) with a weight ratio of 4:1 and including a liquid crystal compound was used. Further, in order to easily confirm conditions of the surface after coating, a dye compound was added to the coating liquid.

Coating was conducted in a manner that a conveyance speed of the web 16 was set to 50 in/min and the coating device 10 was adjusted so that a wet film thickness is 5 µn at coating.

The temperature in the drying zone 76 was set to 100° C., and the temperature in the heating zone 78 was set to 130° C. The web 16, after passing through the drying zone 76 and heating zone, was irradiated with ultraviolet radiation by the ultraviolet lamp 80. Accordingly, liquid crystal was bridged and a desired polymer was formed. Then, the web 16 on which the polymer was formed was taken up by the winder 82.

Example 1

An example 1 is a case where the web 16 is processed under conditions described above. After the web 16 was taken up, we evaluated conditions of the surface of the coating film which was formed on the surface of the web 16 by a visual sensory examination method.

The largest vibration acceleration in the coating device 10 was 0.2 Gal at coating due to the moving truck with the heavy load. From the result of a visual examination of a part of the web 16 (coating sample) corresponding to this vibration, it was confirmed that any coating irregularity was not detected and the conditions of the surface exhibited excellent.

Comparative Example 1

A comparative example 1 is a case of coating under the same conditions as the example 1 except for the active vibration isolation device of an explosion-proof type being unoperated. The measured value of the largest vibration acceleration in the coating device 10 at coating was 0.4 Gal. From the result of a visual examination of a part of the web 16 (coating sample) corresponding to this vibration, fine coating irregularity on the coating film was detected.

Comparative Example 2

A comparative example 2 is a case of coating under the same conditions as the comparative example 1 except for a lighter load loaded on the truck. The measured value of the largest vibration acceleration in the coating device 10 at coating was 0.3 Gal (75% of the comparative example 1). From the result of a visual examination of a part of the web 16 (coating sample) corresponding to this vibration, coating irregularity on the coating film, though minute, was detected, although a smaller amount than that of the comparative example 1.

From the results of the example 1, and the comparative examples 1 and 2, it is confirmed that when the vibration acceleration in the coating device 10 is not greater than 0.2 Gal, an excellent coating film can be achieved.

INDUSTRIAL APPLICABILITY

As explained above, according to the present invention, because coating means is fixed on an active vibration isolation device, various vibrations may be suppressed and a coating film can be resistant to suffering a bad effect. As a result, a coating film having a film thickness of high accuracy and a surface that is flat and has no coating irregularity can be achieved.

What is claimed is:

1. A coating method, using a coating device comprising:
a coating means for forming a coating film having a predetermined film thickness on a continuously conveyed band-like support body, and
coating liquid supply means for supplying a coating liquid to the coating means, wherein the coating means is fixed on an active vibration isolation device,
the coating method comprising:
supplying the coating liquid to the coating means using the coating liquid supply means;
conveying the band-like support body;
forming the coating liquid on the band-like support body by the coating means and forming the coating film;
detecting vibration components of a load bearing portion by an acceleration sensor disposed on the load bearing portion which is supported on a base of the active vibration isolation device; and
controlling the vibration of the active vibration isolation device to permit the coating means to be vibrated at a frequency of not less than 80 Hz.

2. A coating method, using a coating device comprising;
a coating means for forming a coating film having a predetermined film thickness on a continuously conveyed band-like support body, and
coating liquid supply means for supplying a coating liquid to the coating means, wherein the coating means is fixed on an active vibration isolation device,
the coating method comprising:
supplying the coating liquid to the coating means using the coating liquid supply means;
conveying the band-like support body;
forming the coating liquid on the band-like support body by the coating means and forming the coating film;
detecting vibration components of a load bearing portion by a displacement sensor disposed on the load bearing portion which is supported on a base of the active vibration isolation device; and
controlling the vibration of the active vibration isolation device to permit the coating device to be vibrated at a frequency of not less than 80 Hz.

* * * * *